United States Patent [19]
Haynes

[11] 3,780,541
[45] Dec. 25, 1973

[54] MATERIAL FEED RATE CONTROL SYSTEM

[75] Inventor: Jerry L. Haynes, Elizabethtown, N.C.

[73] Assignee: Veeder Industries Inc., Hartford, Conn.

[22] Filed: Sept. 5, 1972

[21] Appl. No.: 286,117

[52] U.S. Cl. .................... 66/125 R, 66/132, 226/40
[51] Int. Cl. .............................................. D04b 3/06
[58] Field of Search .................... 226/42, 30, 40, 9; 235/151.1; 66/125 R, 132, 1 R

[56] References Cited
UNITED STATES PATENTS
| | | | |
|---|---|---|---|
| 3,694,634 | 9/1972 | Horst et al. | 226/42 |
| 3,487,986 | 1/1970 | Nelson et al. | 226/42 |
| 3,690,123 | 9/1972 | Delair et al. | 66/125 R |
| 3,293,760 | 12/1966 | Weller | 66/1 R |

Primary Examiner—Allen N. Knowles
Attorney—John M. Prutzman et al.

[57] ABSTRACT

A knitting machine yarn pay off control system having a first presettable counter indexed in a subtraction direction by a first pulse generator to count the amount of yarn paid off from a driven yarn spool, a second presettable counter indexed in a subtraction direction by a second pulse generator to count the number of cycles of operation of the knitting machine and a bi-directional stepping motor automatically connected to be indexed by a pulse generator—after one of the counters reaches zero and before the other counter reaches zero—for correcting for any difference between the actual pay off rate and a desired pay off rate pre-established by the original settings of the counters.

12 Claims, 1 Drawing Figure

PATENTED DEC 25 1973 3,780,541
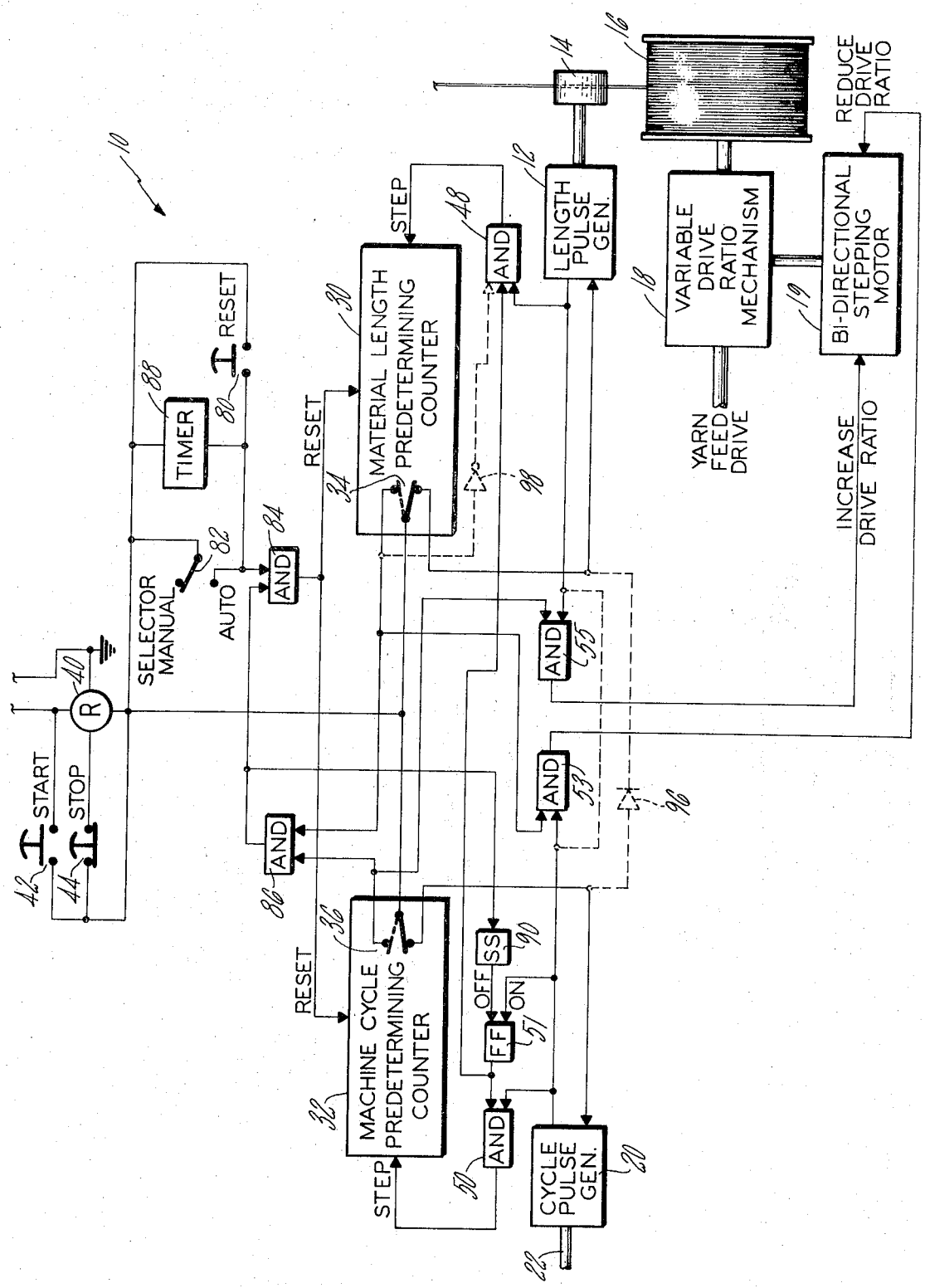

3,780,541

MATERIAL FEED RATE CONTROL SYSTEM

BRIEF SUMMARY OF THE INVENTION

The present invention relates generally to material feed rate control systems and more particularly to such a control system having notable application in a knitting or other textile machine for automatically adjusting the rate of pay off of yarn or other line to correspond to a pre-established desired rate of pay off.

It is a primary aim of the present invention to provide a new and improved pay off control system for a knitting machine for automatically adjusting the rate of rotation of a driven yarn spool for substantially maintaining a pre-setablished desired rate of pay off of yarn.

It is another aim of the present invention to provide a new and improved material feed rate control system adapted to be operated through a cycle for comparing an actual feed rate to a desired feed rate and for automatically adjusting the feed rate for correcting for any difference.

It is a further aim of the present invention to provide a new and improved line pay off control system for automatically controlling the rate of rotation of a pay off spool for automatically maintaining a desired rate of pay off from the spool notwithstanding a changing spool diameter.

It is another aim of the present invention to provide a new and improved material feed rate control system which is automatically periodically cycled to readjust the material feed rate as necessary to maintain a desired feed rate.

It is a further aim of the present invention to provide a new and improved material feed rate control system which is presettable to establish a desired feed rate and which thereafter automatically readjusts the actual feed rate to correct for any difference.

Other objects will be in part obvious and in part pointed out more in detail hereinafter.

A better understanding of the invention will be obtained from the following detailed description and the accompanying drawing of an illustrative application of the invention.

BRIEF DESCRIPTION OF THE DRAWING

In the drawing:

The FIGURE is a partial schematic illustration of a knitting machine incorporating an embodiment of a material feed rate control system of the present invention and showing a modification thereof in broken lines.

DESCRIPTION OF THE PREFERRED EMBODIMENTS

Referring now to the drawing in detail, an embodiment of a material feed rate control system of the present invention is employed in a knitting machine for controlling the rate of pay off of yarn to the knitting apparatus (not shown) of the machine. The control system comprises a "length" pulse generator 12 driven by a roller 14 which engages the yarn as it is fed from its spool 16 such that the pulse generator 12 is operated to generate a pulse for each predetermined length, for example 1 inch, of yarn fed from the spool 16. In a conventional manner the spool 16 is driven via a suitable variable drive ratio mechanism 18 by the associated knitting apparatus so as to pay off yarn in accordance with the speed of the machine and at a rate (established by the drive ratio mechanism 18) in accordance with the type of knitting operation performed by the machine. In accordance with the present invention a suitable bi-directional stepping motor 19 is provided for automatically adjusting the drive ratio mechanism 18 for maintaining an optimum yarn feed rate preestablished for the knitting operation. A second "cycle" pulse generator 20 is connected to be driven by the usual pattern wheel shaft 22 of the knitting machine to generate pulses at a predetermined rate, for example, one pulse for each revolution of the pattern wheel shaft 22.

In accordance with the present invention a base test cycle period is established during which the automatic control system provides for comparing the average yarn pay off or feed rate with a pre-established optimum rate and to automatically readjust the variable drive ratio mechanism 18 with the stepping motor 19 in accordance with any difference. For example if the pre-established optimum yarn feed rate for a particular knitting operation dictates that the spool 16 be rotated to pay off 56 inches of yarn to the knitting apparatus for each 31 revolutions of the pattern wheel shaft 22, then while the yarn is being fed at the optimum rate, 56 pulses would be generated by the "length" pulse generator 12 (i.e where the pulse generator 12 is operated to generate one pulse for each one inch of yarn) during a base test cycle period of 31 revolutions of the pattern wheel shaft 22 during which 31 pulses would be generated by the "cycle" pulse generator 20 (i.e. where the pulse generator 20 is operated to generate one pulse for each revolution of the pattern wheel shaft 22). Thus, if 57 or more pulses are generated by the "length" pulse generator 12 during the base test "period, the spool 16 is rotating too fast and the variable speed drive 18 is readjusted to reduce the spool speed. Similarly if 55 or less "length" pulses are generated by the pulse generator 12 during the base test cycle period the variable speed drive 18 is readjusted to increase the spool speed.

The control system employs a manually presettable "length" subtraction predetermining counter 30 and a manually presettable "machine cycle" subtraction predetermining counter 32 which are connected to be indexed in the subtraction direction by the "cycle" and "length" pulse generators 12, 20 respectively. Before the commencement of a test cycle, the predetermining counters 30, 32 are manually preset to the desired count, in the above example to the counts of 56 and 31 respectively. After the commencement of the test cycle each predetermining counter 30, 32 is indexed one count for each generated pulse from the respective pulse generator until the counter reaches "0" whereupon a double-throw switch 34 or 36 of the counter is actuated from its "running" position shown in full lines in the drawing to its "0" position shown in broken lines. The switch 36 of the "cycle" predetermining counter 32 thereby provides a signal that the pre-established number of machine cycles for the base test cycle period has been completed. Similarly the switch 34 of the "length" predeterminer counter 30 thereby provides a signal that the pre-established optimum length of yarn for the base test cycle period has been fed from the spool 16.

The system is operated by a suitable power source and comprises a master relay 40 adapted to be energized by a start button 42 and de-energized by a stop button 44. The relay 40 when energized connects the power source via the movable switch contacts of the predetermining counter switches 34, 36 to the respective pulse generators such that each pulse generator 12, 20 is activated to index the respective predetermining counter 30, 32 via a respective AND gate 48, 50 while the respective counter 30, 32 is at any count above "0." A suitable flip-flop circuit 51 having an output connected to the AND gates 48, 50 is operated by the first pulse from the "cycle" pulse generator 20 to commence a test cycle and is provided to prevent operation of the counters 30, 32 until after the commencement of the test cycle. The pulse generators 12, 20 are thereupon operative to independently index their respective "length" and "cycle" predetermining counters 30, 32 with succeeding pulses.

When the "length" predetermining counter 30 reaches "0" it's control switch 34 is automatically actuated to deactivate the "length" pulse generator 12 and to operate an AND gate 53 to connect the "cycle" pulse generator 20 to one side of the bi-directional stepping motor 19. The "cycle" pulse generator is connected to the motor 19 such that each succeeding pulse generated by the "cycle" pulse generator 20 will angularly index the motor 19 in one direction to readjust the variable drive ratio mechanism 18 to slightly reduce the spool speed and yarn rate of feed. Thus, when the "length" predetermining counter 30 reaches "0" first any succeeding pulses generated by the "cycle" pulse generator 20 will effect a reduction of the yarn rate of feed and the amount of such reduction will be dependent upon the number of such succeeding pulses generated by the "cycle" pulse generator 20.

Similarly, when the "cycle" predetermining counter 32 reaches "0" its control switch 36 is automatically actuated to deactivate the "cycle" pulse generator 20 and to operate an AND gate 55 to connect the "length" pulse generator 12 to the bi-directional stepping motor 19 and such that any succeeding pulse generated by the "length" pulse generator 12 will be effective to index the motor 19 in the opposite direction to increase the yarn feed rate. Thus, when the "cycle" predetermining counter 32 reaches "0" first any succeeding pulses generated by the "length" pulse generator 12 will be effective to increase the yarn feed rate in accordance with the number of such pulses.

Preferably each step of the bi-directional stepping motor provides for changing the drive ratio of the variable speed drive mechanism 18 only slightly (i.e. 1 percent or less) so that the yarn feed rate can be relatively finely adjusted and a relatively long test cycle can be employed without causing overcorrection.

The predetermining counters 30, 32 may be manually resettable for manually conditioning the counters for a succeeding test cycle and thereby simultaneously actuate the control switches 34, 36 to initiate a new test cycle. Alternatively, as shown in the drawing, the predetermining counters 30, 32 may be electrically resettable (in addition to or instead of being manually resettable). A manually operable reset switch 80 is shown connected via an AND gate 84 for energizing the predetermining counter reset circuits (not shown) for resetting the predetermining counters 30, 32 to their original preset counts at any time after both counters 30, 32 have been indexed to "0." Also the reset control circuit may incorporate a reset mode selector 82 having an "automatic" selector position and such that when the mode selector 82 is in its "automatic" position, the AND gate 84 is automatically operated via an AND gate 86 when both predetermining counters reach "0" to reset the predetermining counters to their preset counts. With the selector 82 in its "manual" position the automatic resetting features is disconnected. Also a timer 88 may be employed for automatically resetting the predetermining counters after each fixed interval in excess of the test interval, for example one minute, and such that a test cycle is run each such interval.

The AND gate 86 is also connected via a suitable single shot circuit 90 to reset the cycle start flip-flop circuit 51 to "Off" to thereby completely deactivate the counting circuit when both counters 30, 32 reach "0."

A system modification is shown in broken lines in the drawing. With the modification the "length" pulse generator 12 is connected to the AND gate 53 (and the "cycle" pulse generator 20 is disconnected from the AND gate 53) for indexing the stepping motor 19 when the "length" predetermining counter 30 reaches "0" before the "cycle" predetermining counter 32 reaches "0." Also the "cycle" predetermining counter control switch 36 is connected via a suitable diode 96 to supply power to the "length" pulse generator 12 after the "length" counter reaches "0," and the "length" counter control switch 34 is connected via suitable inverter 98 to close the AND gate 48 and thereby disconnect the "length" pulse generator 12 from the "length" counter 30 when the "length" counter reaches "0." Thus, with this modification where the "length" predetermining counter 30 reaches "0" before the "cycle" predetermining counter 32 the "length" pulse generator 12 is switched for indexing the stepping motor 19 for decreasing the yarn feed rate. With the modification, where the knitting operation is such that the "length" pulse generator 12 is operative to generate the substantially more pulses than the "cycle" pulse generator 20 during a test cycle and variable speed drive mechanism 18 can be more finely adjusted by indexing the stepping motor 19 with the "length" pulses.

As will be apparent to persons skilled in the art, various modifications, adaptations and variations of the foregoing specific disclosure can be made without departing from the teachings of the present invention.

I claim:

1. For use in a cyclically operable textile machine for making textiles and having a material feed mechanism adjustable for adjusting the linear feed rate of material, a material feed rate control system operable for automatically adjusting the material feed mechanism for at least partly correcting for any difference between the actual linear feed rate and a pre-established desired feed rate, the control system comprising first and second subtracting predetermining counters settable to counts pre-establishing the desired linear feed rate and operating means for indexing the first counter in a subtracting direction from its set count in accordance with the length of material fed to the machine and for indexing the second counter in a subtracting direction from its set count in accordance with the number of cycles of operation of the textile machine and, during the interval after one of the counters reach zero and before the other counter reaches zero, for automatically adjusting the feed mechanism in accordance with the difference between the actual number of counts the first and second counters have been indexed and the set counts thereof.

2. A material feed rate control system according to claim 1 wherein at least one of the counters is variably settable for pre-establishing the desired linear feed rate.

3. In a cyclically operable yarn knitting machine having a variable speed mechanism adjustable for adjusting the yarn linear feed rate to the machine, a material feed rate control system for automatically controlling the rate of feed of yarn to the machine and comprising bi-directional control means for adjusting the variable speed mechanism and operable in opposite directions for increasing and decreasing respectively the linear feed rate, first and second predetermined counter means, operating mean for indexing the first counter means in accordance with the number of machine cycles and for indexing the second counter means in accordance with the length of material fed to the machine and for operating the bi-directional control means for adjusting the material feed rate during the interval after one of the counter means reaches a predetermined count thereof and until the other counter means reaches a predetermined count thereof for adjusting the linear feed rate of yarn.

4. For use in a cyclically operable machine having a material feed mechanism for feeding material to the machine and adjustable for adjusting the material feed rate to the machine, a material feed rate control system comprising first and second counter means, and operating means for indexing the first counter means to count the amount of material fed to the machine and for indexing the second counter means to count the amount of operation of the machine and for automatically adjusting the material feed mechanism for at least partly correcting the material feed rate in accordance with any difference between the actual relationship between the counts of the first and second counter means and a pre-established relationship, the operating means comprising a bi-directional stepping motor for adjusting the material feed mechanism and adapted to be indexed in opposite directions for increasing and decreasing respectively the material feed rate and electrical pulse generator means for indexing the first and second counter means and the stepping motor.

5. A material feed rate control system according to claim 4 wherein at least one of said counter means is selectively presettable to selectively establish said pre-established relationship.

6. For use in a cyclically operable machine having a material feed mechanism for feeding material to the machine and adjustable for adjusting the material feed rate to the machine, a material feed rate control system comprising first and second counter means, and operating means for indexing the first counter means to count the amount of material feed to the machine and for indexing the second counter means to count the amount of operation of the machine and for automatically adjusting the material feed mechanism for at least partly correcting the material feed rate in accordance with any difference between the actual relationship between the counts of the first and second counter means and a pre-established relationship, the operating means being operable for automatically adjusting the material feed mechanism during the interval after one of said counter means reaches an established count thereof and before the other counter means reaches an established count thereof, the said established counts establishing said pre-established relationship.

7. For use in a cyclically operable textile machine for making textiles and having a material feed mechanism for feeding material at an established linear feed rate and adjustable for adjusting the linear feed rate, a material feed rate control system comprising counter means adapted to be indexed to accumulate the actual relationship between the length of material feed to the machine and the number of cycles of operation of the machine and presettable for pre-establishing a desired relationship therebetween, and operating means operable for indexing the counter means to accumulate the actual relationship and for automatically adjusting the material feed mechanism for at least partly correcting the linear feed rate in accordance with any difference between the actual relationship and the pre-established desired relationship, the counter means comprising first and second counters presettable for presetting respective counts establishing said desired relationship, the operating means being operable for indexing the first counter to count the amount of material fed to the machine and for indexing the second counter to count the amount of operation of the machine and for automatically adjusting the material feed mechanism for at least partly correcting the material feed rate in accordance with any difference between the actual counts of the first and second counter means and the preset counts, the operating means comprising first and second pulse generators for indexing the first and second counters respectively, and bi-directional adjustment means operable for automatically connecting at least one of the pulse generators for adjusting the linear feed rate during the interval after one of the counters has been indexed by the amount of the preset count thereof and before the other counter has been indexed by the amount of the preset count thereof.

8. A material feed rate control system according to claim 7 wherein at least one of said counters has a switch operable when the counter is indexed by the amount of the preset count thereof to operate the control means for connecting a pulse generator to operate a bi-directional adjustment means.

9. A material feed rate control system according to claim 7 wherein the counters are resettable to commence a control cycle and further comprising means for automatically resetting the counters after they have both been indexed by the amount of their respective preset counts.

10. For use in a machine having a material feed mechanism for feeding material to the machine and adjustable for adjusting the material feed rate to the machine, a material feed rate control system for automatically adjusting the material feed rate for at least partly correcting the material feed rate in accordance with any difference between the actual feed rate and an established feed rate comprising a bi-directional motor operable for adjusting the material feed mechanism and adapted to be selectively operated in opposite operative directions thereof for increasing and decreasing respectively the material feed rate, first and second counter means, counter drive means for indexing the first counter means to count the amount of material fed to the machine and for indexing the second counter means to count the amount of operation of the machine, and control means for automatically operating the bi-directional motor during substantially the entirety of an interval after one of the counter means has been indexed a first predetermined count thereof and before the other counter means has been indexed a second predetermined count thereof, the said first and second predetermined counts of the first and second counter means determining said established feed rate and the control means providing for operating the bi-directional motor in a selected direction correcting the material feed rate towards said established feed rate.

11. A material feed rate control system according to claim 10 wherein the counter drive means comprises pulse generator means connected for indexing the first counter means to count the amount of material fed to the machine and connected for indexing the second counter means to count the amount of operation of the machine, and wherein the control means comprises first and second control switches operable by the first and second counter means respectively when they are indexed said first and second predetermined counts respectively, the control means being operable by the respective control switch of said one counter means for connecting the pulse generator means for operating the bi-directional motor in said selected direction.

12. A material feed rate control system according to claim 11 wherein the control means is operable by the respective control switch of said other counter means for disconnecting the pulse generator means from operation of the bi-directional motor.

* * * * *